United States Patent

Repik et al.

[11] 3,976,597
[45] Aug. 24, 1976

[54] FLUIDIZED BED PROCESS FOR MAKING ACTIVATED CARBON INCLUDING HEATING BY CONDUCTION THROUGH THE DISTRIBUTOR PLATE

[75] Inventors: Albert J. Repik, Charleston; Charles E. Miller, Mt. Pleasant; Homer R. Johnson, Charleston, all of S.C.

[73] Assignee: Westvaco Corporation, New York, N.Y.

[22] Filed: June 9, 1975

[21] Appl. No.: 585,259

[52] U.S. Cl. .............................. 252/445; 23/284; 34/57 A; 252/421
[51] Int. Cl.² ..................... B01J 21/18; B01J 37/00
[58] Field of Search ........... 252/421, 445; 423/449; 261/31

[56] References Cited
UNITED STATES PATENTS

| | | | |
|---|---|---|---|
| 3,840,476 | 10/1974 | Metrailer | 252/445 |
| 3,843,559 | 10/1974 | Repik et al. | 252/421 |
| 3,887,461 | 6/1975 | Nickerson | 252/421 |
| 3,904,549 | 9/1975 | Barton et al. | 252/421 |
| 3,910,849 | 10/1975 | Kawabata et al. | 252/421 |

FOREIGN PATENTS OR APPLICATIONS

| | | | |
|---|---|---|---|
| 942,699 | 2/1949 | France | 252/411 R |
| 506,544 | 9/1930 | Germany | 252/421 |
| 1,119,238 | 12/1961 | Germany | 252/421 |
| 1,147,533 | 4/1969 | United Kingdom | 252/421 |
| 546,531 | 7/1942 | United Kingdom | 252/421 |

Primary Examiner—Patrick P. Garvin
Assistant Examiner—P. E. Konopka
Attorney, Agent, or Firm—Richard L. Schmalz; Ernest B. Lipscomb, III

[57] ABSTRACT

There is disclosed an improved process for activating carbon in a fluidized bed which includes continuous activation at a temperature between 1,000°F. and 2,200°F., preferably 1,700°F. to 1,950°F. in the bed. The activation step includes heat transfer by conduction through a distributor plate to the bed and means to achieve a high degree of particle agitation, thus allowing a continuous activation of carbon without the formation of sintered coal ash. The prevention of coal ash sintering allows the process to continue over long periods of time without frequent shutdowns. Carbonaceous material is fed into an initial compartment and a bed is formed on the floor of the compartment. The floor is a gas permeable distributor plate. Fluidizing gases are introduced through the plate into this compartment. As the carbonaceous material is added, some carbonaceous material overflows the initial compartment and forms a bed in another compartment. The second compartment is like the first compartment. By overflowing, the carbonaceous material moves through a plurality of similar compartments until it exits the activator as activated carbon. The thermal energy required to activate the carbonaceous material and to maintain the bed temperature is generated by combustion of fuel in a combustion chamber located beneath the plate. It is the purpose of this invention to provide a process whereby a substantial part of the thermal energy is transferred to the bed by conduction through the distributor plate.

5 Claims, 2 Drawing Figures

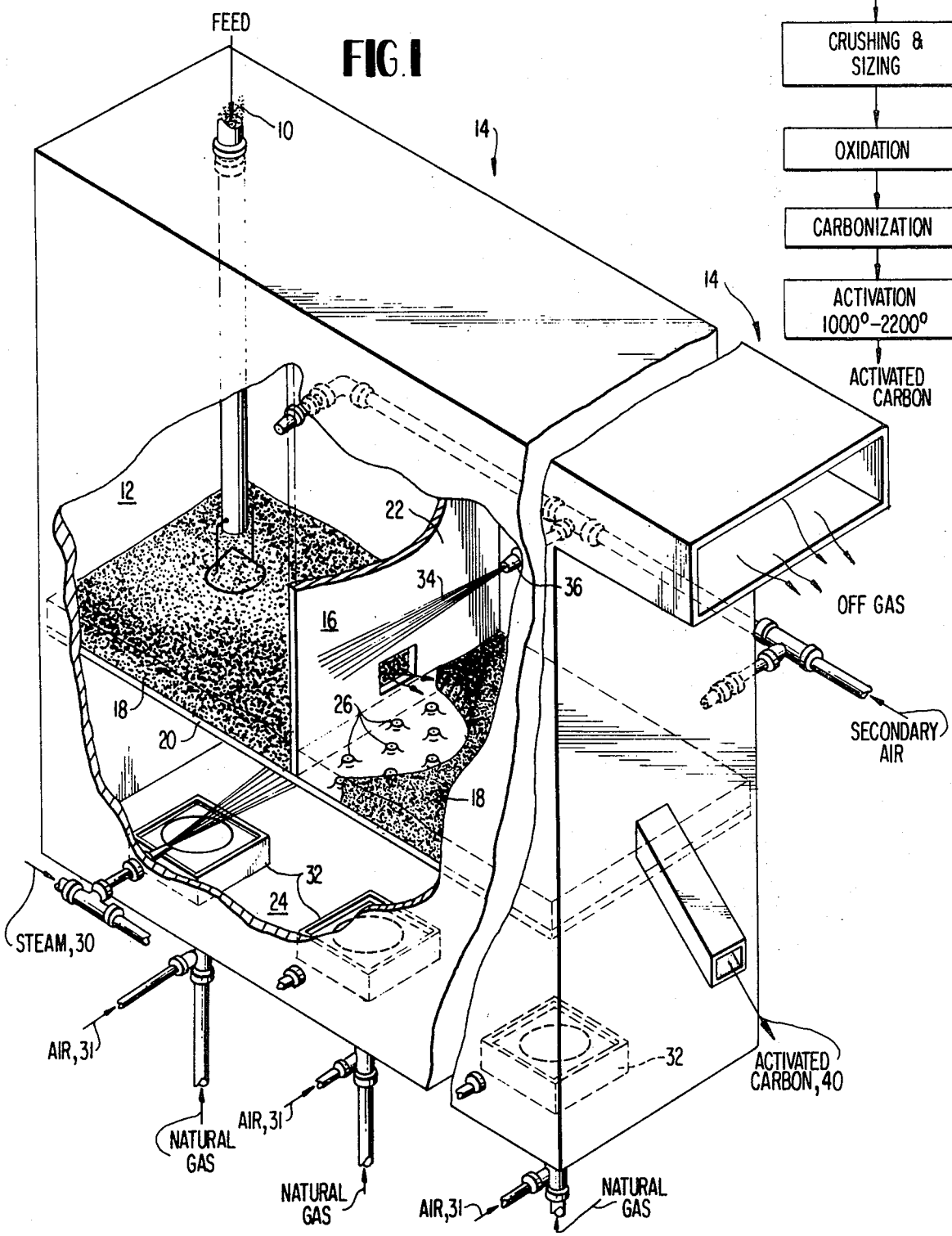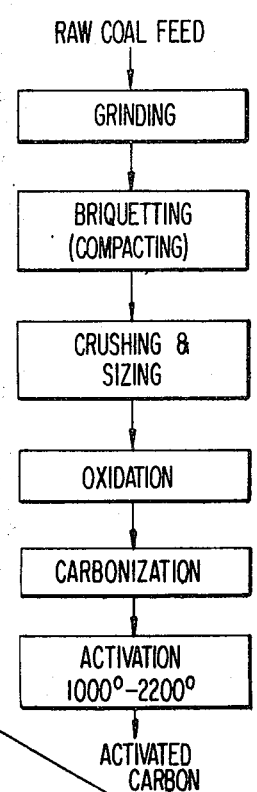

FLUIDIZED BED PROCESS FOR MAKING ACTIVATED CARBON INCLUDING HEATING BY CONDUCTION THROUGH THE DISTRIBUTOR PLATE

Background of the Invention

1. Field of the Invention

This invention relates to a process for activating carbon. More particularly, this invention relates to a process for using a continuous fluid bed to activate granular carbon and involves advancing the carbon through a plurality of similar activation compartments. The heat required to activate the carbon is added by a process which maintains the bed temperature between 1,000°F. and 2,200°F. and prevents coal ash sintering. A substantial portion of heat transferred to the bed is conducted through the gas distributor plate.

2. Description of the Prior Art

Sources from which activated carbon is derived include animal materials, such as bone and vegetable matter, such as wood and coconut shells. Activated carbon is also produced from coal. If coal is to be activated in a thermal process to produce granular carbon, the coal is exposed to an oxidizing gas, such as steam, air or carbon dioxide. The oxidizing gases react with the coal and cause an increase in the pore volume and surface area. The desirable properties of activated carbon stem from the increase in pore volume and surface area.

The processing steps for coal taken prior to activation of the carbon can be referred to as pretreatment or preconditioning. U.S. Pat. No. 3,843,559 by Repik et al. describes such pretreatment in detail. This patent is incorporated by reference.

To produce granular activated carbon from coal, three methods have been used. The first, and most widely used process involves activation using a multi-hearth furnace. U.S. Pat. No. 3,539,467 to Bozarth et al. describes such activation. An alternative method of activation is a rotary kiln as described in *Activated Carbon* by J. W. Hassler, published by *Chemical Publishing, Inc.*, New York, 1963. A third method of activation involves fluid bed technology.

Briefly, in fluid bed activation, the pretreated feed material is introduced into an enclosed chamber. The chamber is provided with a gas permeable base plate called a distributor plate, through which gases are admitted into the chamber from below to contact the bed of carbonaceous material and impart continuous movement to the particles comprising the bed. In this state of rapid continuous movement, the particles are fluid in nature and possess flow properties. Typical fluidizing gases include; (1) a mixture comprising nitrogen, carbon dioxide and steam from the combustion of natural gas, (2) a mixture comprised of combustion gases with addition of excess steam and (3) pure steam.

Unfortunately, because of various problems, fluid bed technology has heretofore not proved to be an entirely suitable commercial alternative to carbon activation using a multihearth furnace. A serious problem has been coal ash sintering, which results in the formation of ash within the bed and on the gas distributor plate of the fluid bed activator. Sintering of coal ash is a serious problem in activation of coal in a fluidized bed process. Agglomerates of ash particles can form by the sintering process and result in non-uniform gas distribution, lower production rates and eventually in equipment shutdown. It has been reported by Arthur M. Squires in *Science* 169:821–826 (Aug. 28, 1970) that almost all coal ash is self-adhering at a temperature of above about 2,000°F., the so-called sintering temperature. Although fluidized bed activation processes preferably operate at bed temperatures below about 2,000°F. so that sintering does not occur in the bulk of the bed, supply of thermal energy for the endothermic activation reactions and for other normal heat loads can result in temperatures at some locations in the system, such as the gas distributor plate upper surface, which are above the sintering temperature.

Some fluid bed activation methods have circumvented or minimized the potential for ash sintering by controlling both the temperature of the fluidizing gases and of the fluidized bed at about 1,400°F.-1,800°F., well below the sintering range. One such fluid bed activation process was reported by R. Bailey and J. Wilson in "A High Temperature Fluidized Process for the Activation of Anthracite" published in *Journal of Brimingham University Chemical Engineering Society*, 1974. This process is operated in a batch manner, with respect to solids flow, to activate anthracite coal in a single fluidized stage at bed temperatures between 1,560°F. and 1,780°F. Steam is supplied at temperatures up to 1,670°F. to serve as the fluidizing gas with gas distribution achieved using a perforated cone arrangement. This steam is also the reactant gas, and heat for the endothermic carbon-steam reaction is supplied by gas burners located in the reactor wall above the bed and discharging their hot combustion products into the bed. It is pointed out that the burners are designed and operated to insure that little free oxygen enters the bed. Problems with ash sintering are not mentioned in description of this process. Even if some sintering did occur as a result of contact between the hot combustion gases and the carbon particles, accumulation of sintered ash would probably not occur because of the batch mode of operation. Although sintering might not be a problem with this technique, batch processing has other well known disadvantages in comparison with continuous processing, such as lower equipment capacity and high production costs.

A second problem encountered in the development of fluid bed activation of carbon has been backmixing. Backmixing, a characteristic of single-stage fluidized beds, is a term used to indicate that the coal particles do not all remain in the fluid bed for the same period of time.

Relatively low fluidizing gas and bed temperatures are utilized in a fluidized bed technique for activation of carbonized material for which J. R. Friday was granted U.S. Pat. No. 3,565,827 in 1971. This patent primarily discloses a means for minimization of particle backmixing which is indicated to be detrimental to product quality and yield. Minimization of backmixing is accomplished through use of a reactor having a plurality of stages, 3 to 50, arranged in series and with each successive stage arranged with an overflow means lower than the overflow means of the preceding stage. The fluidizing gas is selected from the group consisting of oxygen, air, steam, carbon dioxide and mixtures of these gases and is preferably preheated to the temperature level of the fluidized beds which have a preferred range of 1,400°F.-1,600°F. for activation of delayed petroleum coke with steam. Heat to carry out the activation process is supplied in an indirect manner through combustion of gaseous or liquid fuels and a radiation cone is included to achieve more efficient heat utilization. Disadvantages of this technique include the need for a relatively large reactor to contain a plurality of stages, non-uniformity of the indirect heating means, and the potential for maintenance problems arising from differing amounts of thermal expansion of the interconnected stages and gas manifolding arrangements.

A batch process for activation of carbonaceous materials using pure steam as the fluidizing gas is disclosed in U.S. Pat. No. 3,677,727 to A. Godel. The novel feature of Godel involves operation with zero fuel requirements with the heat requirements supplied by combustion of the activating off-gases by using at least two reactors which operate in an activating-reheating cyclic manner. While batch activation is occurring in a first reactor, the off-gases are being combusted in a second reactor where the heat is stored in refractory masses. This heat is subsequently extracted while the second reactor is in the activation phase and, of course, the first reactor is now operating in the reheating phase. The refractory masses of Godel should be resistant to adherence of sintered ash, which indicates that the sintering phenomena could be a problem.

Other representative examples of the prior art patents relative to fluidized bed and carbon activation or regeneration technology include, U.S. Pat. Nos. 3,852,216; 3,804,581; 3,756,922; 3,770,369; 3,617,727; 3,565,821; 3,153,633; 2,933,454; 2,851,428; 1,858,745; 1,843,616; British Pat. No. 1,302,456; and French Pat. No. 951,153.

In view of the prior art, it will be apparent from the descriptions which follow that the process according to the present invention has overcome the disadvantages of prior approaches and allows production of activated carbon in an economic and efficient manner.

BRIEF SUMMARY OF THE INVENTION

A process has been found that permits the temperature levels of the upper plate surface and the fluidizing gases to be controlled to prevent coal ash sintering while operating the fluid bed within the temperature range for activation, 1,000°F.–2,200°F., and preferably within the desired temperature range of 1,700°F. to 1,950°F. by transfer of a substantial part of the thermal energy required for activation by conduction through the gas distributor plate. Once the bed advances beyond the first compartment, it is preferred to carry out the process of activation within the preferred range. This process also prevents the particles comprising the bed from becoming stagnant and especially insures movement of those particles in contact with the plate.

Briefly, the process involves activating carbon by advancing a fluid bed of feed material through a plurality of compartments in combination with a process that maintains the bed temperature between 1,700°F. and 1,950°F. by proper selection of heat transfer conditions. The important features of the process which insure the required heat transfer include characteristics of the gas permeable distributor plate and particle agitation on the upper surface of the plate. The process may also include using excess oxygen as a component of the fluidizing gases. The heat transfer mechanism is accomplished in such a manner that sintering and fusion of particles comprising the bed are prevented. Advancing the feed material through a plurality of compartments prevents backmixing.

Potential advantages of fluidized bed equipment over the other types for the activation step include:
1. more uniform activating conditions with respect to temperature and to contact of the carbonaceous material with the oxidizing gases,
2. smaller equipment size and land area requirements,
3. lower capital costs,
4. incremental additional or expansion with respect to equipment size and capital requirements, and
5. short activation times and lower material inventory.

BRIEF DESCRIPTION OF THE DRAWING

FIG. 1 shows a fluidized bed reactor having a portion of its wall cut away for use with the process of this invention.

FIG. 2 is a block diagram illustrating a process for making activated carbon.

DETAILED DESCRIPTION OF THE OPERATION OF THE INVENTION

Quantitatively, the energy required to sustain continuous activation of carbon at high temperatures, i.e., between 1,700°F. and 1,950°F., has been found to be about 25,000–150,000 B.T.U./Hr./ft.$^2$ of reactor area using the bed temperature as reference. This amount of thermal energy or heat can be provided by the sensible heat of the fluidizing gases; however, this would require the fluidizing gases to be of such high temperature they would exceed the critical coal ash sintering temperature.

A process has been found which provides a substantial part of the heat required to drive the activation reaction from a source other than the sensible heat of the fluidizing gases. By a substantial portion of the heat, it is meant at least 10%; however, under preferred operating conditions, a majority of the heat required may be provided in this manner. This process allows operation with a high bed temperature but with the temperature of upper plate surface and fluidizing gases below that required for the onset of sintering. By way of Equation [1], the amount of heat required for activation is expressed as:

$$Q_T = Q_S + Q_A \qquad [1]$$

where:
$Q_T$ = total heat input into the bed, B.T.U./Hr.
$Q_S$ = rate of sensible heat input into the bed, B.T.U./Hr.
$Q_A$ = rate of heat input from all sources except the sensible heat, B.T.U./Hr.

The process of this invention transfers a substantial part or in some cases all of $Q_A$ by means of conduction through the gas distributor plate. Hence $Q_A = Q_C$ and Equation [1] becomes:

$$Q_T = Q_S + Q_C \qquad [2]$$

where:
$Q_C$ = rate of heat input by conduction through the plate, B.T.U./Hr.

Using the heat transferred through the gas distributor plate, $Q_C$, as the source of a substantial part of the thermal energy, $Q_T$, to sustain the activation process requires special attention to various factors. It has been found that: (1) plate composition or material, (2) plate thickness and (3) degree of particle agitation on the plate upper surface are most critical in operating the process. In turn, the degree of particle agitation is affected by plate structure and fluidizing velocity. The heat transferred by conduction can be expressed by Equation [3] as:

$$Q_C = U_o A (T_{GC} - T_B) \qquad [3]$$

where:

$Q_C$ = rate of heat input by conduction through plate, B.T.U./Hr.
$U_O$ = overall heat transfer coefficient, B.T.U./Hr.-Ft.$^2$-°F.
A = cross-sectional area through which heat can be conducted, Ft.$^2$
$T_{GC}$ = gas temperature in combustion chamber, °F.
$T_B$ = temperature of fluidized bed, °F.

The effects of plate characteristics and particle agitation are contained in the different components of the overall heat transfer coefficient which is expressed in Equation [4] as:

$$U_o = \frac{1}{\frac{1}{h_T} + \frac{\Delta X}{K} + \frac{1}{h_B}} \qquad [4]$$

where:

$h_T$ = film coefficient for heat transfer from top surface of the plate into the bed, B.T.U./Hr.-Ft.$^2$-°F.
$h_B$ = film coefficient for heat transfer from the chamber to the bottom surface of the plate, B.T.U./Hr.-Ft.$^2$-°F.
$\Delta X$ = plate thickness, Ft.
K = thermal conductivity of plate, B.T.U./Hr.-Ft.$^2$-°F.

Equation [4] indicates that the overall coefficient, and thus the amount of heat transferred for a given area and temperature differential according to Equation [3] depends on the film coefficients and plate characteristics in the following manner: 1. $U_O$ increases as the top coefficient, $h_T$ is increased. The top film coefficient can be increased by increasing the particle agitation on top surface of the plate. Agitation is related to plate design and fluidizing velocity. It should be pointed out that if $h_T$ is near zero as would be the case with a stagnant layer of particles, then $U_O$ is near zero and the amount of heat transferred by conduction would be negligible.

2. The overall coefficient, $U_O$, increases as the plate thickness $\Delta X$, decreases. $U_O$ increases as the plate thermal conductivity increases. Of course, thermal conductivity is dependent on the materials of construction for the plate and can have a significant effect on the amount of heat conducted and thus the fluidizing gas temperature.

3. $U_O$ increases as the bottom coefficient, $h_B$, increases. This coefficient probably depends on thermal emissivity which is a property of the materials of construction and on gas flow patterns at the bottom surface of the plate. Measurements indicate that the coefficient is relatively large and thus has little influence on the amount of heat transferred through the plate. Typical values for the rate of heat conduction, heat transfer coefficients, and plate characteristics will be given in a latter example.

The sensible heat in the fluidizing gas that is transferred to the bed is expressed in Equation [5] as:

$$Q_S = FC_p (T_{GI} - T_B) \qquad [5]$$

where:

$Q_S$ = rate of sensible heat input, B.T.U./Hr.
F = rate of fluidizing gas flow, Lb. Moles/Hr.
$C_p$ = heat capacity of gas, B.T.U./Lb. Mole-°F.
$T_{GI}$ = fluidizing gas temperature entering fluidized bed, °F.
$T_B$ = temperature of fluidized bed, °F.

In the past, it has been the practice to provide the majority of the thermal energy to activate the carbon by means of the sensible heat contained in the fluidizing gas. With most of the heat input by this mechanism, temperatures of the gas entering the bed and of the plate top surface exceeded the ash sintering temperature, 2,000+°F., so that sintering of the ash occurred. This problem led to development of the conditions for transferring a large part of the heat by conduction.

Another source of thermal energy for the activation process can be excess air in the fluidizing gases. The use of excess air (i.e., air in excess of the stoichiometric amount required for combustion with natural gas) causes exothermic reactions to occur within the fluidized beds. The heat produced by these exothermic reactions is utilized to sustain the activation process.

With proper plate design, the exothermic heat generated is dispersed rapidly which prevents momentary, localized, excessively high temperatures which could be detrimental from both equilibrium and coal ash sintering standpoints.

DETAILED DESCRIPTION OF THE PREFERRED EMBODIMENT

Referring now to FIG. 1 feed material 10, which is sized and pretreated, is introduced into a first compartment 12 of a fluid bed activator 14 having a plurality of compartments. For convenience FIG. 1 represents only the first and last compartments of the activator. It is to be understood that any number of compartments can be placed between the first and last compartments; or in its broadest sense, the process of this invention may be used employing only one compartment. The intermediate compartments, similar or identical to the first compartment 12 and last compartment 16, communicate to allow continuous advancing fluidized flow of the feed material from compartment to compartment until the material exits the activator by overflowing. The preferred feed material 10 is coal which has been pretreated. Throughout the remainder of this description the feed material will be referred to as coal, although it is understood that other carbonaceous materials are capable of being activated by the process described herein. FiG. 2 is a flow diagram illustrative of the sizing and pretreatment operations prior to activation. U.S. Pat. No. 3,843,559 by Repik et al describes these steps taken prior to activation.

The coal particles 10 which are introduced into the first compartment 12 are of a size suitable for fluidizing. In general, the coal particles can have diameters ranging between ¾ inch to 100 mesh. The coal used as the feed material can be either coking or non-coking in nature. It is conceivable that if the coal is a non-coking type and properly sized it could be introduced directly into the activator, but when a coking coal is used it must be pretreated before feeding it into the activator.

During start-up, the continuous introduction of feed material 10, in the form of sized and pretreated coal particles, results in the formation of a bed 18. As will be described, gases are distributed throughout the bed 18 to impart to the bed a fluid nature. As particles are continuously introduced into the feed end of the activator 14, particles in the bed 18 are displaced and flow into adjacent compartments 16. Beds 18 of particles are eventually formed and then maintained in each compartment of the activator. Each bed 18 is in a fluidized state. During activation, particles flow from compartment to compartment as they are displaced by particles flowing from succeeding compartments which take their place.

The compartments of the activator 14 are in communication with each other so that the fluid coal particles can flow from compartment to compartment. It is preferred to use a baffle-type construction at the point at which two compartments communicate with one another. Various other structures which function to permit the particles to flow from compartment to compartment while controlling backmixing are also possible.

The floor of each compartment of the fluid bed reactor 14 is gas distributor plate 20. The particles accumulate at or near the top surface of gas distributor plate 20 to form bed 18. It is critical to the process of this invention that gas distributor plate 20 be capable of transferring a large quantity of heat to the bed by means of conduction. Transfer, by conduction, of a substantial part of the thermal energy required to heat the bed to a temperature at which the coal particles can be activated at an appreciable rate instead of transfer by the sensible heat of the fluidizing gases, allows the process to run at high bed temperatures while eliminating sintering problems. As can be appreciated, higher bed temperatures cause the activation process to proceed at a faster reaction rate.

Gas distributor plate 20 is provided with means to allow fluidizing gases to flow from below the plate into each compartment of the reactor 14. The gases introduced through the distributor plate 20 serve to impart motion to the particles 10 forming the bed 18. The result is to place the particles in a state of continuous agitation, a fluid state. Combined with the continuous introduction of feed material the fluid state of the bed permits a flow of the particles comprising the bed from compartment to compartment until they exit the activator 14 as activated carbon 40.

The design of gas distributor plate 20 is a factor that can prevent stagnation of particles from occurring. That is to say, the means by which the fluidizing gases are introduced into the bed 18 through gas distributor plate 20 can influence the degree of agitation of the particles comprising the bed. It is preferable to use a gas distributor plate having nozzles or tuyeres 26 which project slightly above the surface of the plate.

The fluidizing gases enter the particle bed 18 with a velocity which is sufficient to cause all the particles comprising the bed to be continuous motion, that is to say in a fluid state. The velocity sufficient to import continuous motion is dependent upon, among other things, the size of the feed material. It is important to prevent the presence of stagnant particles especially on the surface of gas distributor plate 20.

The most basic fluidizing gas is a mixture of combustion gas and an oxidizing gas. The combustion gas is a product of burning a mixture of fuel, such as natural gas, and air. The combustion takes place in a burner 32 which is usually placed inside a combustion chamber 24, preferably located directly below gas distributor plate 20. This permits the transfer of a large portion of heat to the bed 18 by conduction through the plate. Heat is also transferred to the bed by the sensible heat of the hot fluidizing gas.

Steam is the preferred oxidizing gas which is added to the combustion gases to form the mixture which fluidizes the bed. The oxidizing gas, steam, is responsible for the activation of the coal (carbon) particles which form the bed. The reaction of steam with carbon increases the pore volume of the particles which results in an increase surface area. The activation process occurs at temperatures of 1,000°F. and above. As shown by FIG. 1, steam is added directly to the combustion chamber under gas distributor plate 20. There the steam mixes with the combustion gas.

The fluidizing gas mixture can also contain excess air 31, as well as combustion gas and oxidizing gas. By excess air, it is meant air in excess of the amount required for complete combustion of a given quantity of natural gas. When excess air is a component of the fluidizing gases, the oxygen contained therein can combine exothermically with the feed material and the products of the activation reaction. Because the exothermic reaction provides heat to maintain the bed within the preferred range for activation, 1,700°F. –1,950°F., it results that the heat that must be supplied from the fluidizing gases is decreased. Also, it may be desirable to inject secondary excess air 34 above the fluidized bed to supply additional heat by radiation.

The pretreated coal particles are continuously fed into the first compartment 12 where in the preferred embodiment of the process they reach a maximum temperature of about 1,400°F. to 1,600°F. The fluidizing gases introduced through the distributor plate 20 serve to fluidize the bed 18 and to transfer thermal energy to the bed with the result that the temperature of the bed is increased. However, as previously discussed, a substantial part of the thermal energy used to increase the temperature of the bed is not provided by the sensible heat of the fluidizing gases, but comes from other sources. A substantial part of the heat required to raise the bed temperature to the range of the first compartment, 1,400°F. to 1,600°F., is provided by conduction through the distributor plate. If excess air 31 is a component of the fluidizing gas, then in addition to the heat provided by conduction and the sensible heat, some of the energy to raise the temperature of the bed will result from the exothermic reactions with oxygen and the products formed by activation of the carbonaceous material, as a result of the reaction with the oxidizing gas in the fluidizing gas, preferably steam. Because of the rather low temperatures in the first compartment, the activation rate is lower than the rate achieved when the particles progress to the next compartment where the bed temperature is between 1,700°F. and 1,950°F.

The particles flow from the initial compartment 12 to a next compartment 16. Once again the fluidizing gases flow through the distributor plate 20 and cause the particle bed to be fluid in nature. The thermal energy required to heat the carbon bed to the temperature desired for activation, 1,700°F. to 1,950°F., comes from the sensible heat of the fluidizing gases, conduction of heat through the distributor plate, and, if excess air is a component of the fluidizing gases from the exothermic reaction between the oxygen in the excess air and the products of the activation reaction. In the second compartment, the temperature is such that the activation reaction proceeds at a high rate. For this reason, it is especially advantageous to add excess air to the fluidizing gases because the excess air reacts with the products of the activation, which in this compartment are present to a greater extent than they are in the initial compartment. If desired, secondary excess air 34 may be injected over the bed in both the initial compartment 12 and the succeeding compartments 16. The bed temperature in this compartment, and in all compartments after the initial compartment will be preferably maintained between 1,700°F. and 1,950°F., the temperature at which activation occurs at high rates without the occurrence of coal ash sintering.

The carbon bed flows through any number of similar compartments. It should be recognized that each of the compartments through which the carbon flows will be similar in nature or identical to the initial compartment. As will be appreciated by those skilled in the art, the greater the number of compartments between the first compartment and the final compartment the more closely the process will resemble a batch process. That is to say, that as the number of compartments increases the problem presented by backmixing is correspondingly reduced. Also it should be noted that the arrangement of compartments is optional; as long as there is communication between each successive compartment the path through which the carbon bed flows may be varied.

The practice of the process of this invention can be more fully understood by study of the following example.

EXAMPLE

Carbon was activated using a single stage fluid bed reactor of the type previously described. The gas flows and temperatures were measured during the activation process and used in calculating the thermal energy inputs. The following heat inputs and gas flows are based on a distributor plate area of one square foot, the process was carried out at atmospheric pressure, and the bed temperature was 1,750°F.

The total heat input, $Q_T$, was 46,258 B.T.U./Hr. This value was determined by calculations using the bed temperature as a basis in conjunction with measurements of the natural gas, air and steam flows together with heat capacities for these gases and heat losses from the combustion chamber.

The sensible heat input was determined to 17,315 B.T.U./Hr. by calculations utilizing Equation [5]. The rate of the fluidizing gas flow, F, was 5.51 Lb. Moles/Hr. The heat capacity of the gas, $C_p$, was 9.67 B.T.U./Lb. Mole°F. The fluidizing gas temperature as it entered the bed of particles, $T_{GI}$, was 2,075°F. It is worthy to note that if all of the heat, $Q_T$, had been provided by the sensible heat, the fluidizing gas temperature would have been 2,618°F.

As has been described, it has been found that a substantial part of the thermal energy utilized in this process of activating carbon comes from sources other than the sensible heat of the fluidizing gases. In this example, the rest of the thermal energy was provided by conduction of heat through the tuyere distributor plate. The conduction heat input, $Q_C$, was 28,943 B.T.U./Hr., 62.6% of the total heat input, $Q_T$.

The overall heat transfer coefficient, $U_O$, was determined to be 64.3 B.T.U./Hr.-Ft.$^2$-°F. Using this value in Equation [4] and the following values for the metal alloy distributor plate:

$k$ = 215.4 B.T.U./Hr.-Ft.$^2$-°F.
$x$ = 0.625 inch $h_B$ = 202 B.T.U./Hr.-Ft.$^2$-°F.

the top coefficient, $h_T$, was calculated;

$h_T$ = 129.9 B.T.U./Hr.-Ft.$^2$-°F.

The temperature of the top surface of the plate was calculated as follows:

$$\text{Temperature Drop across Top Film} = \frac{Q_C}{A h_T}$$

$$= \frac{28{,}943 \text{ B.T.U./Hr.}}{(1 \text{ Ft.}^2)(129.9 \text{ B.T.U./Hr.-Ft.}^2\text{-°F})}$$

$$= 223°F$$

Top Surface of Plate = 1,750°F. + 223°F.

$$= 1{,}973°F.$$

The temperature of the top surface of the plate was, therefore, below the ash sintering temperature.

Under these conditions, a commercially acceptable activated carbon, exceeding specifications of the American Water Works Association, found in "AWWA Standard for Granular Activated Carbon", AWWA B604-74 (First Edition), Approved Jan. 28, 1974 was prepared. No sintering was observed during the activation process. The carbon had the following properties:

| | |
|---|---|
| Nominal Particle Size: | 12 × 40 Mesh |
| Iodine Adsorption Numbers: | 1,147 mg/g |
| Apparent Density: | 30.6 Lbs./Ft.$^3$ |
| Molasses Decolorizing Index No.: | 9.1 |

It should be appreciated that the present invention is not to be construed as being limited by the illustrative embodiments. It is possible to produce still other embodiments without departing from the inventive concepts herein disclosed. Such embodiments are within the ability of those skilled in the art.

What is claimed is:

1. A process for manufacturing activated carbon from granular coal particles that have been rendered non-agglomerative and carbonized which comprises:
   a. continuously feeding said non-agglomerative and carbonized coal particles into a fluidized bed supported on a horizontal gas distributor plate;
   b. and at the same time passing an activating gas from below through said gas distributor plate at a velocity at least sufficient to provide for fluidizing said coal particles, said gas distributor plate having tuyeres projecting above the upper surface of said plate whereby substantially all of said coal particles on the upper plate surface in said fluidized bed are in continuous motion;
   c. activating said coal particles by maintaining a constant level of thermal energy required for activation at maximum yield in said fluidized bed by supplying,
      1. at least 10% of said thermal energy by conduction of heat from hot activating gas below said distributor plate through said plate to the fluidized bed, and
      2. the remainder of said thermal energy being supplied by the sensible heat of the activating gas to thereby provide a temperature in said fluidized bed between 1,000°F. and 2,200°F. while maintaining the upper surface of said gas distributor plate below the sintering temperature of said coal particles; and d. separating the gases from the thus activated carbon and recovering said activated carbon.

2. The process according to claim 1 wherein said activation is carried out in a plurality of interconnected fluidized beds.

3. The process according to claim 2 wherein the temperature in said fluidized beds is maintained constant at a temperature between 1,700°F. and 1,950°F.

4. The process according to claim 2 wherein the activating gas is a mixture of steam and the gas formed by the combustion of a hydrocarbon.

5. The process according to claim 1 wherein at least a majority of the thermal energy required for activation is supplied by conduction through said gas distributor plate.

* * * * *